Oct. 26, 1943.    S. W. CLARK    2,332,698
AUTOMATIC BRAKE CONTROL
Filed June 4, 1942
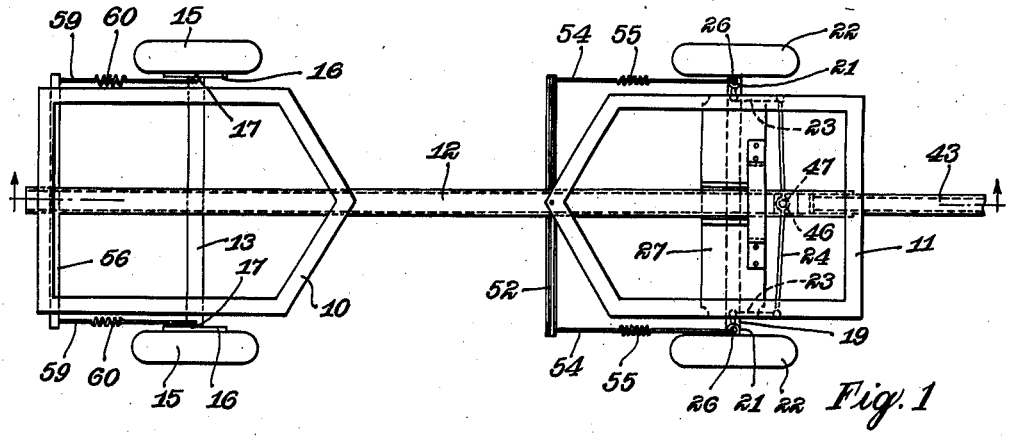
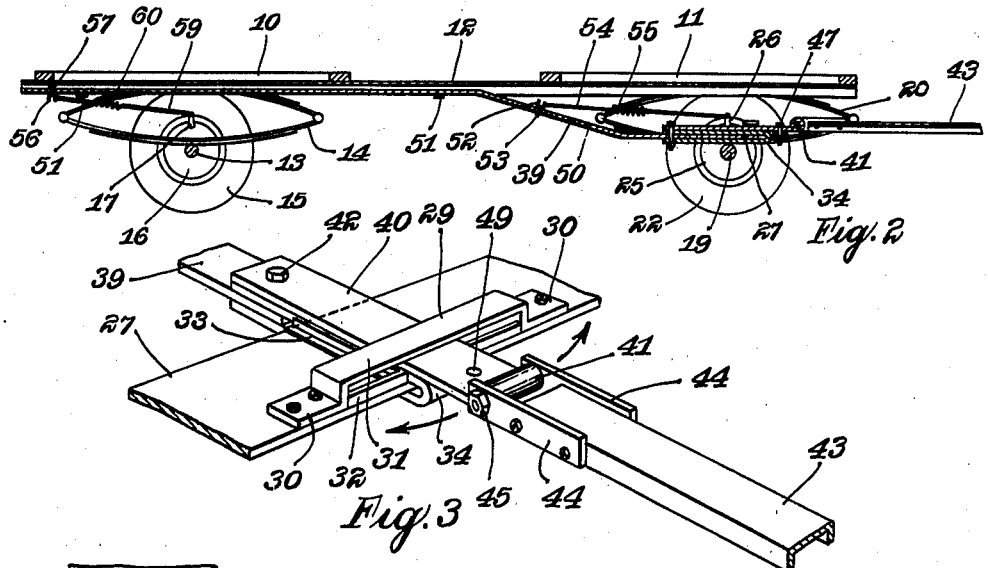
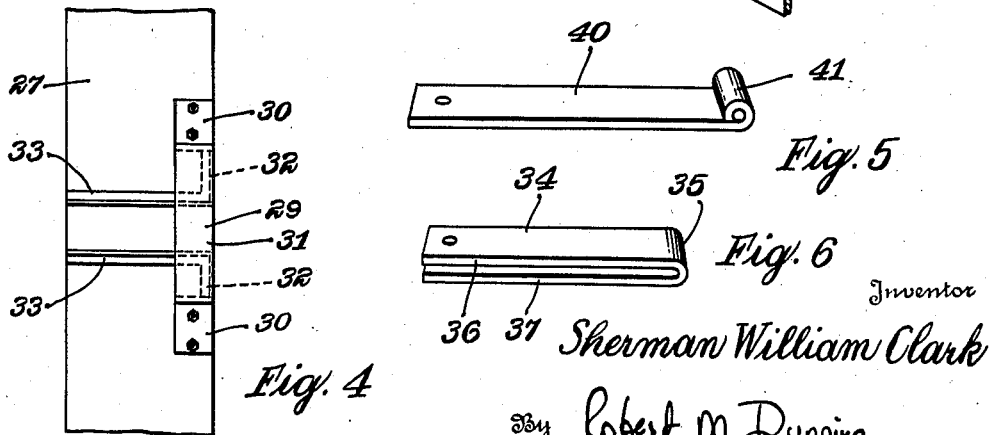
Inventor
Sherman William Clark
By Robert M. Dunning
Attorney Patented Oct. 26, 1943

2,332,698

UNITED STATES PATENT OFFICE 2,332,698

AUTOMATIC BRAKE CONTROL

Sherman William Clark, St. Paul, Minn.

Application June 4, 1942, Serial No. 445,695

8 Claims. (Cl. 188—142)

My invention relates to an improvement in automatic brake control wherein it is desired to provide a device, by means of which a trailer can be pulled, which is capable of controlling the brakes of the trailer.

It is an object of the present invention to provide an automatic brake controlling device capable of operating on trailers of the four-wheel type so as to automatically apply the brakes on these trailers when the speed of the trailers with respect to the speed of the towing vehicle is excessive. My device automatically sets the brakes on all of the wheels either momentarily or for a period of time when it is so desired.

A further feature of the present invention lies in the provision of a trailer brake setting device which is actuated through the bar connected to the towing vehicle. When the towing vehicle is exerting a pull upon the trailer, the brakes are released. On the other hand, when the draw bar is subjected to compression such as when the trailer is traveling at a slightly greater speed than the towing vehicle, the brakes are applied.

A feature of the present invention lies in the provision of a novel connecting means for connecting the tractor draw bar to the brake actuating mechanism. The brake actuating mechanism includes a slidable pole or bar which is held from lateral movement, but which is allowed to slide longitudinally between set limits. A guiding means is provided for this pole or bar adjacent the ends thereof. The draw bar is pivotally connected to the pole or bar intermediate the ends of the pole or bar so that the draw bar may pivot laterally from this point. As a result, there is little lateral strain on the slidable pole or bar even while the trailer is turning at a considerable angle allowing this pole or bar to operate with a minimum of difficulty.

A feature of the prevent invention lies in the simple means provided for limiting longitudinal movement of the slidable pole or bar. I provide a substantially U-shaped bracket which encloses the center section of a plate secured to the axle of the trailer. The open end of this U-shaped bracket is closed by connection with the slidable pole or bar. As a result, the longitudinal movement upon the bar is transmitted directly to this heavy plate secured to the front axle.

These and other objects and novel features of my invention will be more clearly and fully set forth in the following specification and claims.

In the drawing forming a part of my specification:

Figure 1 is a top plan view of a trailer frame and chassis showing the construction thereof.

Figure 2 is a longitudinal section centrally through the chassis illustrated in Figure 1 of the drawing.

Figure 3 is a perspective view of the connection between the draw bar and the trailer.

Figure 4 is a top plan view of the draw bar plate through which strain is transmitted.

Figure 5 is a perspective view of the connection element connecting the draw bar to the trailer.

Figure 6 is a perspective view of a U-shaped element which encloses a portion of the plate shown in Figure 4 to limit longitudinal movement of the pole or bar.

The trailer chassis includes a pair of frame members 10 and 11 which may be of any desired shape or conformation, but which are shown generally rectangular in shape with a rather pointed inner side. The frame elements 10 and 11 may be made out of any desired material, and are shown connected by an integral inverted channel-shaped connecting member 12. This channel 12 holds the frame elements 10 and 11 in proper relationship and longitudinally aligned.

The rear axle 13 is secured to the frame element 10 by any suitable means, such as through the springs 14. The rear axle 13 supports the rear wheels 15, each of which preferably incorporates a suitable brake within a brake drum 16. A brake actuating lever 17 is provided for each brake, and it is this brake actuating lever which must be operated to apply the brakes, as will be later described.

The front axle 19 is supported beneath the frame element 10 by any suitable means such as by the springs 20. The front axle 19 is terminally provided with knuckle joints 21 to which the front wheels 22 are connected. Steering arms 23 are connected to the knuckle joints 21 by means of which the wheels 22 may be pivoted about their generally vertical axes. A tie rod 24 connects the steering arms 23 so as to pivot the wheels 22 in unison.

Each of the wheels 22 is provided with a brake drum 25 including a brake which is actuated by means of a brake arm 26. The arms 26 must be operated in unison in order to apply the brakes within the wheels 22. The means which actuate the brake arms 26 will be later described in detail.

A plate 27 is welded or otherwise secured to the axle 19 and is spaced slightly above this axle 19. The plate 27 is provided with a retaining bridge 29 which comprises a flat strip having aligned attaching ends 30 and an offset center portion 31. As is best illustrated in Figures 3 and 4 of the drawing, angle members 32 are provided beneath the offset portion 29 extending from the aligned end portions 30 to a point spaced from the center of the plate 27.

Angle members 33 are secured to the surface of the plate 27 extending longitudinally of the frame member. These angle members 32 and 33 are spaced apart sufficiently wide to form a channel to embrace a U-shaped slidable member 34, best seen in Figure 6 of the drawing.

The U-shaped plate enclosing element 34 includes a closed forward end 35 and a pair of spaced upper and lower arms 36 and 37, respectively. The arm 36 is designed to overlie the plate 27 between the angles 32 and between the angles 33. The arm 36 is of the same height as the angles 32 and 33 and these angles prevent lateral movement of the slidable member 34. These angles do not hinder longitudinal movement of the U-shaped plate enclosing member 34 with respect to the frame. The arm 37 underlies the plate 27 and extends rearwardly beneath the arm 36.

An elongated pole or bar 39 has its forward end sandwiched between the arms 36 and 37 of the U-shaped element 34. A tongue 40 is provided with a transverse journal 41 at one end thereof and is designed to overlie the upper arm 36 of the U-shaped element 34. A bolt 42 extends through the tongue 40 at the end thereof opposite the journal 41 and this bolt also extends through the arms 36 and 37 of the U-shaped element 34 and the forward end of the pole or bar 39. When the bolt 42 is in place, the slidable movement of the U-shaped element 34 is limited. The forward sliding of the U-shaped element is limited by the engagement of the forward end of the bar 39 against the edge of the plate 27. Rearward movement of the U-shaped element 34 is limited by the closed end 35 of this U-shaped element.

It will be noted that with this construction, the U-shaped element 34 and the bar 39 connected thereto, are held laterally centered with respect to the trailer frame. However, the tongue 40 is free to pivot laterally from the pivot bolt 42. This permits the steering of the trailer, as will be later described in detail.

The draw bar 43 may be channel-shaped in cross-section, as is illustrated in the drawing, and may include a pair of rearwardly projecting parallel side plates 44 extending beyond the rear end of the same. A pivot bolt 45 is designed to extend through the plates 44 and through the journal 41 on the tongue 40, thus permitting pivoting of the draw bar 43 about a horizontal pivot. In other words, the draw bar 43 may pivot up and down, as well as laterally and the tongue 40 is held aligned with the draw bar 43.

The tie rod 24 is provided with a central bearing 46 to accommodate a pivot bolt 47. This pivot bolt extends through the aperture 49 in the tongue 40 and connects the center of the tie rod 24 to the tongue. As a result pivotal movement of the tongue acts to pivot the wheels 22 in unison.

The pole or bar 39 extends rearwardly from the U-shaped element 40 and then inclines upwardly and rearwardly at 50 until it is embraced by the longitudinally extending channel 12. The bar 39 then extends rearwardly enclosed within the channel 12 and is held in place by transversely extending guides 51 which close the base of the channel 12. These cross members 51 support the pole or bar 39 and hold the same enclosed within the channel 12.

The transversely extending bar 52 is centrally pivoted at 53 to the bar 39. This bar 52 extends laterally to a point centrally spaced from the bracket actuated arms 26. The elements 54 connect the ends of the arm 52 to the arms 26. The connecting elements 54 include springs 55 which compensate for any differences in movement between the opposed arms and which allow movement of the arm 52 after the brakes have been applied. Rearward movement of the bar 39 thus acts to apply the brakes in the wheels 22.

A second transversely extending arm 56 is pivotally secured at 57 to the bar or pole 39. The arm 56 extends out laterally to a point rearwardly spaced from each of the brake arms 17 and the brakes within the brake drums 16 of the rear wheels 15. These members 59 connect the ends of the arm 56 to the brake arms 17 so that rearward movement of the bar 39 pivots the brake arms 17 to apply the brakes within the brake drum 16. Resilient means 60 are provided within the connecting means 59 to absorb shock and strain.

In operation, the trailer is pulled by the draw bar 43. When the trailer is turned the draw bar 43 pivots about the vertical pivot 42, the tongue 40 maintaining its alignment with the draw bar 43 and sliding upon the upper surface of the angles 32 and 33 beneath the retaining bridge 29.

As long as a pull is exerted against the draw bar 43, the tongue 40 is pulled forwardly to the limit of its movement, the forward end of the bar 39 engaging the edge of the plate 27 to limit this forward movement.

When the speed of the trailer starts to exceed that of the towing vehicle, the pulling force on the draw bar 43 is relieved and a rearward force is exerted upon the draw bar. This rearward force tends to urge the U-shaped member 34 rearwardly, sliding the bar 39 rearwardly within the channel 12. This action moves the arms 52 and 56 rearwardly, thus acting through the connecting elements 54 and 59 to apply the brakes within their respective wheels. The application of the brakes tends to slow the speed of the trailer until the trailer is travelling at a speed equal to, or slower than the towing vehicle, whereupon a pulling force is again exerted upon the draw bar, relieving the brakes.

When the trailer is standing idle on a hill, the towing vehicle tends to back against the trailer, thus setting the brakes. Furthermore, when the trailer comes to a stop, the brakes of the towing vehicle are applied, therefore setting the brakes on the trailer. The brakes remain set until a pulling force is again exerted upon the draw bar. The brakes may be kept from being applied if it is desired to do so, by inserting a flat piece of iron or other material between the closed end 35 and the U-shaped element 34 and the forward edge of the plate 27.

In accordance with the patent statutes, I have described the principles of construction and operation of my automatic brake control, and while I have endeavored to set forth the best embodiment thereof, I desire to have it understood that obvious changes may be made within the scope of the following claims without departing from the spirit of my invention.

I claim:

1. In combination with a trailer frame supported by wheels incorporating brake mechanisms, an automatic brake control including a longitudinally slidable bar means, means at each end of said bar engaging said bar means for guiding the same, means connecting said bar means to the brake mechanisms of said wheels for applying said brakes upon movement of said bar means, and a tongue for actuating said bar means, said tongue being pivotally connected to said bar means intermediate said engaging means.

2. A trailer brake for use in combination with a trailer frame and supporting wheels embodying brakes and brake operating mechanism, comprising a bar means extending longitudinally of the trailer, means slidably supporting each end of said bar means, an equalizer bar pivotally secured to said bar and extending transversely therefrom, means connection each end of said equalizer bar to said brake operating mechanism, and a draw bar pivoted to said bar means intermediate said slidably supporting means.

3. A trailer brake for use in combination with a trailer frame and supporting wheels embodying brakes and brake operating mechanism, a bar extending longitudinally of the trailer, means slidably supporting each end of said bar, an equalizer bar pivotally secured to said bar and extending transversely therefrom, means connecting each end of said equalizer bar to said brake operating mechanism, a draw bar pivoted to said bar intermediate said slidably supporting means, and means limiting the pivotal movement of said draw bar relative to said first named bar.

4. A brake applying mechanism for use in combination with trailers having a frame, front and rear axles secured thereto, supporting wheels embodying brakes and brake actuating mechanism, a bar extending longitudinally of said frame, means connecting said bar to said brake actuating mechanism, a transversely extending plate mounted adjacent the front axle of the frame, means on said plate holding said bar from transverse movement, a tongue pivoted to said bar rearwardly of said plate, and a tie rod connecting the front wheels of the trailer pivoted to said tongue forwardly of said plate.

5. A brake applying mechanism for use in combination with a trailer having a frame, front and rear axles secured thereto, rear wheels mounted on said rear axle, front wheels pivotally secured to said front axle for steering purposes, brakes and brake actuating mechanism embodied in each said wheel, a bar slidably secured longitudinally of said frame, means slidably supporting said bar at opposite ends thereof, means connecting said bar to said brake actuating mechanism, means holding said bar from transverse movement, a draw bar tongue pivoted to said bar between said supporting means, a tie rod connecting said front wheels, and means pivotally connecting said tie rod to said tongue.

6. A brake applying mechanism for use in combination with a trailer having a frame, front and rear axles secured thereto, rear wheels mounted on said rear axle, front wheels pivotally secured for steering purposes to said front axle, brakes and brake actuating mechanism embodied in each said wheel, a bar slidably secured longitudinally of said frame, means connecting said bar to said brake actuating mechanism, a transverse plate mounted adjacent said front axle, a substantially U-shaped bracket enclosing a portion of said plate and being secured to said bar, guide means on said plate holding said bracket from transverse movement, a draw bar tongue pivoted to said bracket, and a tie rod connecting said front steering wheels and pivoted to said tongue.

7. A brake applying mechanism for use in combination with a trailer having a frame, front and rear axles secured thereto, rear wheels mounted on said rear axle, front wheels pivotally secured for steering purposes to said front axle, brakes and brake actuating mechanism embodied in each said wheel, a bar slidably secured longitudinally of said frame, means connecting said bar to said brake actuating mechanism, a transverse plate mounted adjacent said front axle, a substantially U-shaped bracket enclosing a portion of said plate and being secured to said bar, guide means on said plate holding said bracket from transverse movement, a draw bar tongue pivoted to said bracket, and a tie rod connecting said front steering wheels and pivoted to said tongue, said guide means being of a height to support said tongue when in pivoted relation to said bar.

8. A brake applying mechanism for use in combination with a trailer having a frame, front and rear axles secured thereto, rear wheels mounted on said rear axle, front wheels pivotally secured for steering purposes to said front axle, brakes and brake actuating mechanism embodied in each said wheel, a bar slidably secured longitudinally of said frame, means connecting said bar to said brake actuating mechanism, means holding said bar from transverse movement, a tongue pivoted to said bar, a tie rod connecting said front wheels, means pivotally connecting said tie rod to said tongue, and a draw bar pivotally connected to said tongue along a substantially horizontal pivot.

SHERMAN WILLIAM CLARK.